United States Patent [19]

Leroy

[11] 4,398,590

[45] Aug. 16, 1983

[54] HEAT EXCHANGER WITH REVERSING FLOW CYCLE FOR THE RECOVERY OF HEAT FROM FURNACE SMOKE

[75] Inventor: Michel Leroy, St. Jean de Maurienne, France

[73] Assignee: Aluminum Pechiney, Lyons, France

[21] Appl. No.: 222,674

[22] Filed: Jan. 5, 1981

[30] Foreign Application Priority Data

Jan. 9, 1980 [FR] France .............................. 80 00662

[51] Int. Cl.³ ............................................ F28D 17/00
[52] U.S. Cl. ....................................... 165/4; 432/180; 165/10; 165/7
[58] Field of Search ....................... 165/4, 10, 9.3, 9.4; 432/180, 181

[56] References Cited

U.S. PATENT DOCUMENTS 2,973,623 3/1961 Nettel ................................ 165/4 X

FOREIGN PATENT DOCUMENTS 658404 4/1938 Fed. Rep. of Germany .......... 165/4
1460728 10/1966 France ..................................... 165/4
895463 5/1962 United Kingdom .................... 165/4

Primary Examiner—Albert W. Davis, Jr.
Attorney, Agent, or Firm—McDougall, Hersh & Scott

[57] ABSTRACT

A recovery-type furnace for the indirect transfer of heat between two gaseous fluids flowing in opposite directions comprises two heat exchanging units which function alternately as a heating and a heated unit and which operate on a reversing cycle of a few seconds to several minutes. Each exchanging unit is packed with at least one bed of ceramic particles that rest on a metal or ceramic support. The direction of gas flow is controlled by reversing devices so that the hot gaseous fluid flows to the top of the particle bed of the heated unit and, upon cooling, passes through the bed support and from the bottom of the particle bed downwardly through the unit.

9 Claims, 18 Drawing Figures

HEAT EXCHANGER WITH REVERSING FLOW CYCLE FOR THE RECOVERY OF HEAT FROM FURNACE SMOKE

BACKGROUND OF THE INVENTION

The present invention relates in general to heat exchangers for metallurgical furnaces and, in particular, to a recovery-type heat exchanger with reversing flow cycle specifically designed for recovering calories from furnace smoke.

The heat contained in the smoke emitted from a furnace must be recovered if the energy supplied to the furnace is to be used efficiently. The recovered energy may be used for such general purposes as in the heating of buildings or plants. This use, however, is seasonal and is limited to cold weather applications. The annual recovery rate is therefore very limited.

In addition, the recovered energy can be used for such specific purposes as the preheating of furnace loads, the production of steam, and the preheating of combustion air by smoke. Furnace loads can be preheated only when the furnace operates for significant periods of time at maximum heat. Furnaces with alternating heat and hold cycles (or even cooling cycles) have a thermal output of smoke that is extremely variable and does not allow for maximum recovery of heat from the smoke. The same problem exists in the production of steam. For efficient recovery, steam consumption must be closely correlated with the thermal output of smoke; this is difficult to achieve. The preheating of combustion air by smoke is probably the most efficient use because a direct correlation between the smoke output and the combustion air flow rate is possible. Moreover, heat loss during transportation is greatly reduced. For optimum efficiency and minimum cost, a regular counterflow must be maintained between the two gases which exchange the heat. This counterflow can be either direct or indirect.

There are several direct counterflow heat exchangers currently in use. For example, metal tubular exhcangers with actual counterflow or crossflow are well known to those skilled in the art. These exchangers, however, have several disadvantages which include high cost, cleaning difficulties, and sensitivity to corrosive smoke components such as sulphur and vanadium or treatment salts. Racing of the furnace can also cause a heat surge and thereby destroy the furnace by overheating. Glass tube exchangers are generally corrosion resistant, but they are very fragile and costly. The tubes can also be destroyed by overheating or thermal shock. Normally, they are used only in cold climates as inserts for metal tubular exchangers to minimize the damage of acid condensation from the smoke. Metal plate exchangers can also be used. These exchangers are relatively inexpensive but they are sensitive to corrosion and are very difficult to clean because the gaps between the plates often measure only a few millimeters. In addition, the efficiency of a metal plate exchanger is greatly reduced when the plate is dirty or clogged. These exchangers can also be destroyed by overheating.

Indirect counterflow exchangers include two types- rotary exchangers and reversing cycle exchangers. Rotary exchangers have a metal or a porous ceramic wheel so that when the wheel is rotating, smoke flowing in one direction and combustion air flowing in the opposite direction alternately pass through each element of the wheel, parallel to the axis of rotation.

Although these heat exchangers are very efficient, they have low tolerance to dirt buildup, and therefore require clean and non-corrosive smoke. They are also highly sensitive to overheating even if such overheating is only temporary. In particular, smoke temperatures must not exceed 800° C, and for this reason, manufacturers provide a cool air inlet to cool the smoke and to maintain it below the 800° C. level. In addition, the outer part of the wheel generally wears out rather quickly. Because of the design of a rotary exchanger, a tight seal between the two gaseous streams is often poor. The fluid to be heated can leak into the fluid to be cooled and can account for 5% to 10% of the energy output. Consequently, the efficiency of the exchanger is further reduced.

Reversing cycle exchangers are composed of two parallel stationary units. When one unit is storing heat from smoke flowing in one direction, the other unit releases the heat it has stored to the gas to be heated which is flowing in the opposite direction. The flows of smoke and gas to be heated are periodically reversed. A Frankl exchanger is a reversing type that can be used at low temperatures. Each unit includes coils of corrugated metal sheets; these coils are separated from one another by fireproof spacers. This type of exchanger is used in cryogenics liquifying and separating gases. A brick wall exchanger is suitable for use at high temperatures. Each unit is composed of brick walls separating the gas flow channels. These exchangers have a low sensitivity to corrosion and occasional overheating. Yet, they are hard to clean and generally their cleaning destroys the exchanger. In addition, the investment cost is considerable because of the low ratio of "exchanger surface area to refractory volume" which requires an enormous exchanger volume. For the same reason, the reversing cycle is extremely long and can last for several hours.

The device of the present invention fulfills a long-felt need in the elimination of the aforementioned disadvantages in the recovery of waste heat from furnace smoke.

SUMMARY OF THE INVENTION

The present invention relates to a heat recoverer and exchanger with reversing cycles capable of regulating the indirect heat transfer between two gaseous fluids flowing in opposite directions. The apparatus comprises two exchanger units which function alternately as a heating unit when the gaseous fluid to be heated flows upwardly through the unit, and as a heated unit when the gaseous fluid to be cooled flows downwardly through the unit. The device has a short reverse cycle time of between several seconds to a few minutes.

Each exchanger unit is packed with at least one bed of ceramic particles having a specific exchange surface area equal to at least 300 square meters per cubic meter, over 50 percent porosity, and a pressure loss of less than 20 millibars per meter of bed thickness for a 20° C. air stream flowing through the bed at a flow rate of 4500 kg per square meter of bed per hour. The particles rest on a metal or ceramic support, either porous or punctured, that yields a low pressure loss in relation to the pressure loss experienced by the gases in the refractory particle bed. The gaseous fluid streams are controlled by means of reversing devices so that the hot gaseous fluid is directed to the top of the particle bed in the heated unit, flows through the support of the particle bed and, once cooled, leaves from the bottom of the bed. Thereafter, the cold gaseous fluid is directed to the top of the particle bed in the heating unit, flows through the support of that bed and, once warmed up, leaves from the top.

In addition to these major characteristics, the ceramic particle bed is equipped on its upper surface with a preforated refractory slab to maintain the particle bed in position when the exchanger is placed on a tilting furnace where the maximum tilting angle is greater than the slope angle of the ceramic particles used.

As to the actual components used, each unit can contain at least two superimposed beds of ceramic particles, with the lower bed comprising acid resistant ceramic particles. The support of the particle bed can be a metal or ceramic grid with an anti-acid coating and a perforation percentage of at least 50 percent. The diameter of the ceramic particles contained in the exchanger units can range from 5 to 50 millimeters. Ceramic particles of this type are commonly used in rectifying columns or in wash towers in the chemical lindustry. The time required for reversing the flow direction of the two gaseous fluids is regulated based on the flow rates of the gaseous fluids at a given time.

The recovery-type heat exchanger of this invention is used for recovering heat from smoke emitted by furnaces, combustion chambers and boilers. This smoke can reach temperatures of at least 800° C. when entering the recovery-type exchanger.

DETAILED DESCRIPTION OF THE INVENTION

Figure 1:
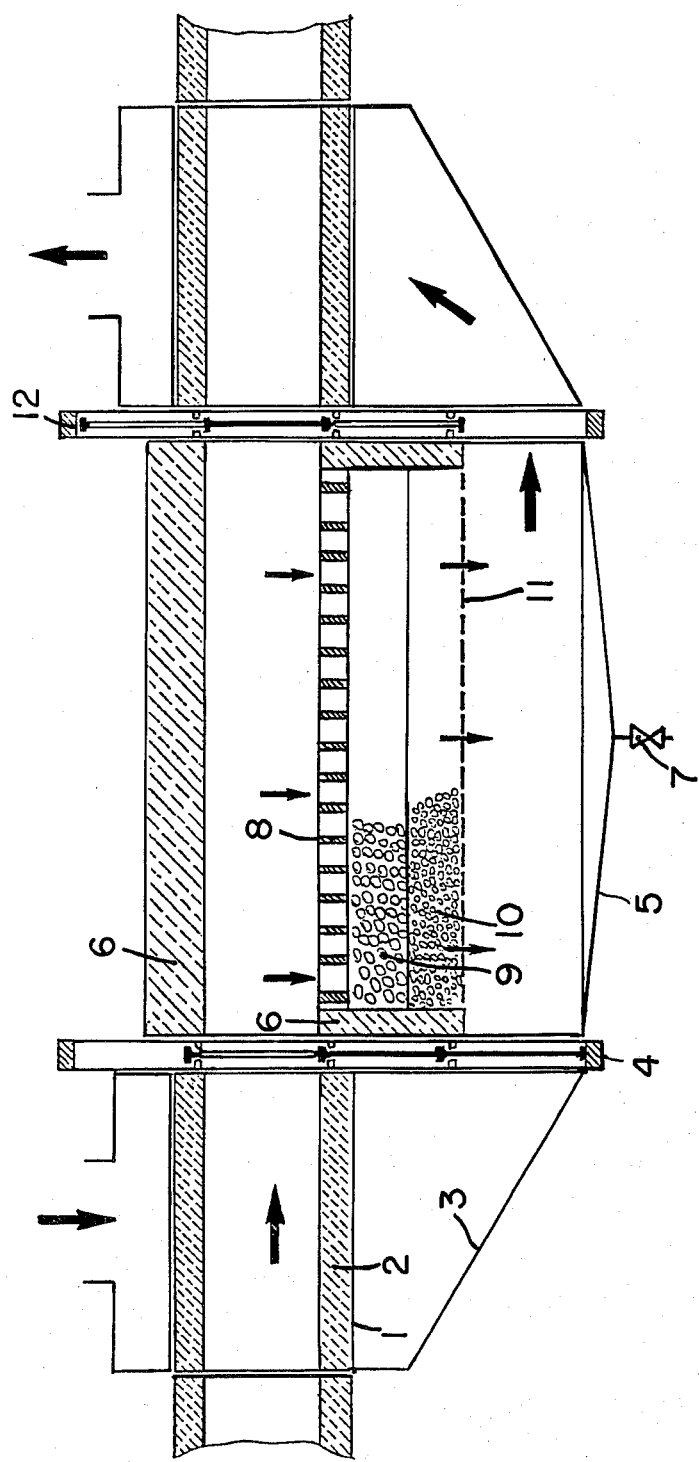
FIG. 1 is a longitudinal section of one unit (unit A) of the exchanger.

FIG. 1 illustrates a longitudinal section of one of the two units in our exchanger (unit A). The reversing valves in this embodiment are located in such a way that smoke will flow upwardly through unit A which functions as the heated unit. The smoke is directed toward the exchanger unit by an inner metal casing 1 that is coated on the interior with a refractory sealer 2. Cool combustion air to the exchanger flows between the inner metal casing 1 and an outer metal casing 3. A set of inlet valves 4 directs the smoke toward the desired exchanger unit while shutting off the combustion air supply to the unit. Smoke enters exchanger unit 5 which is coated, at least in hot zones, with a heat insulating lining 6 and is equipped at its bottom with drain valves 7 for the removal of any acidified water produced by smoke condensation. In this embodiment, the smoke first flows through a perforated refractory slab 8 which can be divided into several adjacent elements. The slab serves to maintain the ceramic particles in position when the furnace on which the exchanger is installed is a tilting furnace. Of course, this refractory slab is not needed when the exchanger remains in stationary position.

The smoke flows through a first bed of heat resistant ceramic particles 9 before passing through a second bed of acid resistant particles 10. Both superimposed beds 9 and 10 rest on metal grid 11 which has been coated with an anti-acid sealer. The smoke finally flows through the grid. Once cooled, the smoke is directed, by the set of outlet valves 12, similar to the set of valves 4, toward an exhaust fan (not shown) by means of an outlet distributor (also not shown).

Figure 2:
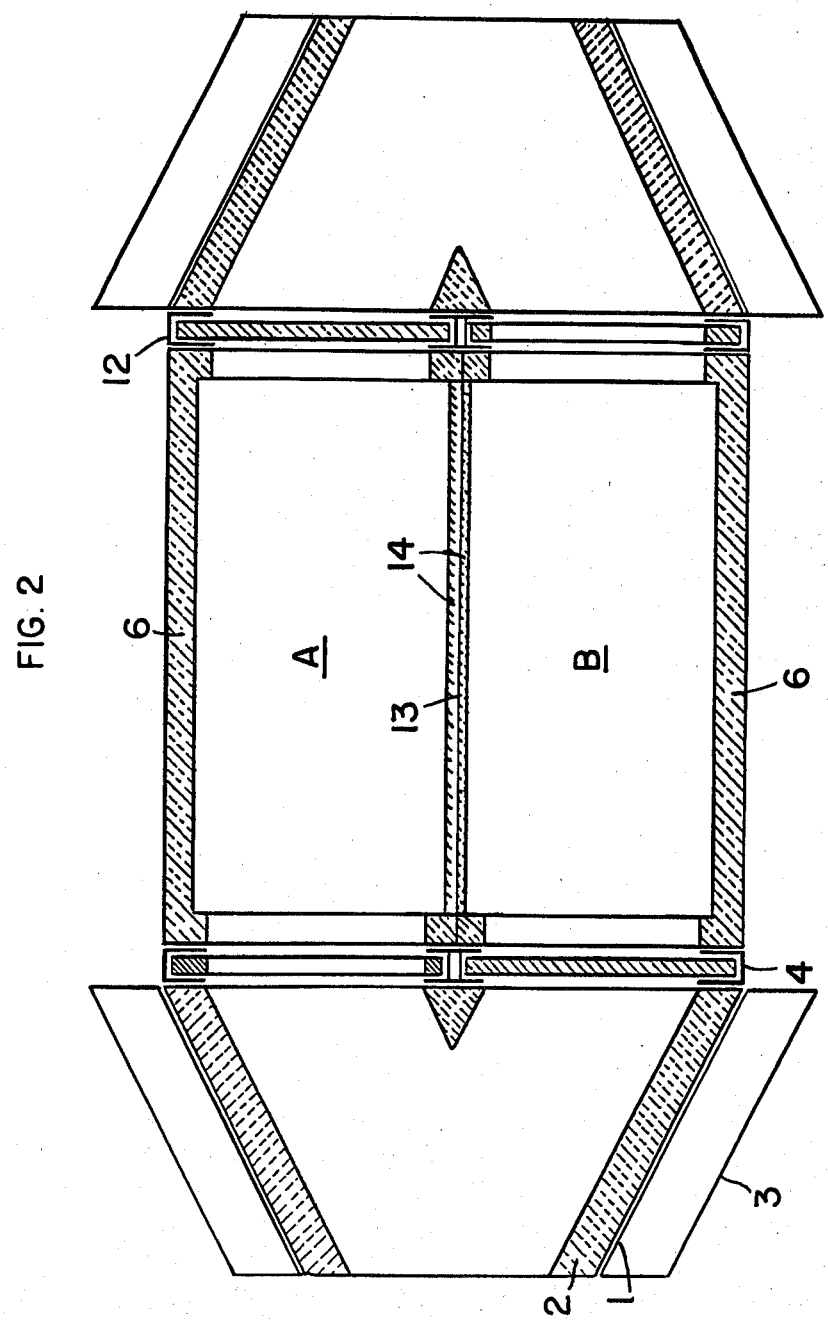
FIG. 2 is a horizontal section of units A and B of the exchanger.

FIG. 2 shows a horizontal section of the recovery-type exchanger at the level of the smoke inlet ducts and the overheated air outlet ducts. Several elements shown in FIG. 1 are also seen here, but center wall 13 is added to separate units A and B. Both sides of this center wall are covered with an insulating refractory material 14, the main purpose of which is to prevent any significant vertical heat conduction through the wall and to protect the wall from smoke corrosion.

Figure 3:
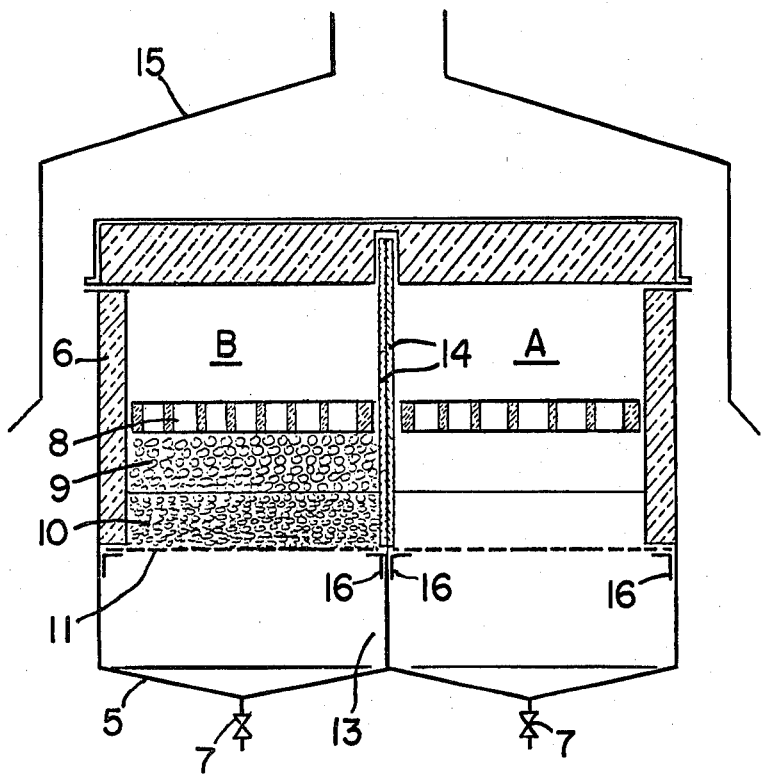
FIG. 3 is a cross section of units A and B.

FIG. 3 shows a cross section of units A and B of the exchanger. Brackets 16 have a dual function: supporting the grids 11 or perforated metal sheets which hold the refractory beds, and reinforcing the vertical metal walls of the casing 3. A hood 15 can be used to recover air heated by heat loss from the exchanger units, loss from the walls or from the leaking of gaseous fluids. This warm air can be redirected toward a combustion air supply fan, thus contributing to heat recovery.

Figure 4:
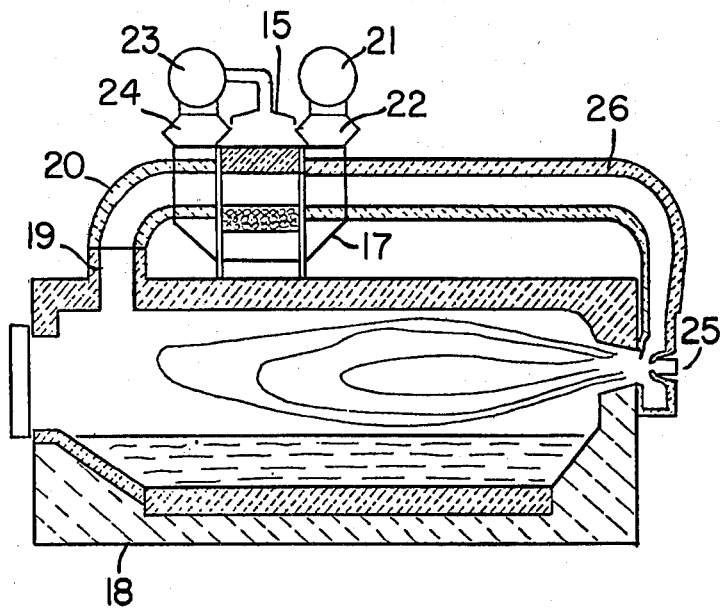
FIG. 4 is a drawing of the exchanger installed on an aluminum smelting furnace.

FIG. 4 is a schematic representation of a recovery-type exchanger installed on an aluminum smelting furnace in which the aluminum is maintained in a molten state. The recoverer 17 is placed on top of a furnace 18. Smoke escaping from a vent 19 is returned to the recoverer through duct 20. After flowing through the recoverer, the smoke is evacuated through exhaust fan 21; the smoke flow rate is regulated by exhaust draft valve 22. Combustion air, heated slightly by heat loss from the exchanger, is collected by the hood 15 and flows through fan 23. The combustion air flow rate is controlled by valve 24. After going through the recoverer, the air then is directed to a burner 25 through an insulated duct 26. The burner can be used with overheated air.

Figure 5:
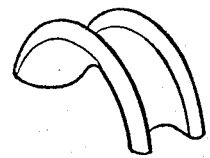
FIG. 5 shows the shape of a TORUS type ceramic particle.

FIG. 5 illustrates a suitable shape for the ceramic particle used in the exchanger. This particular shape is known in the art as TORUS.

Figure 6:
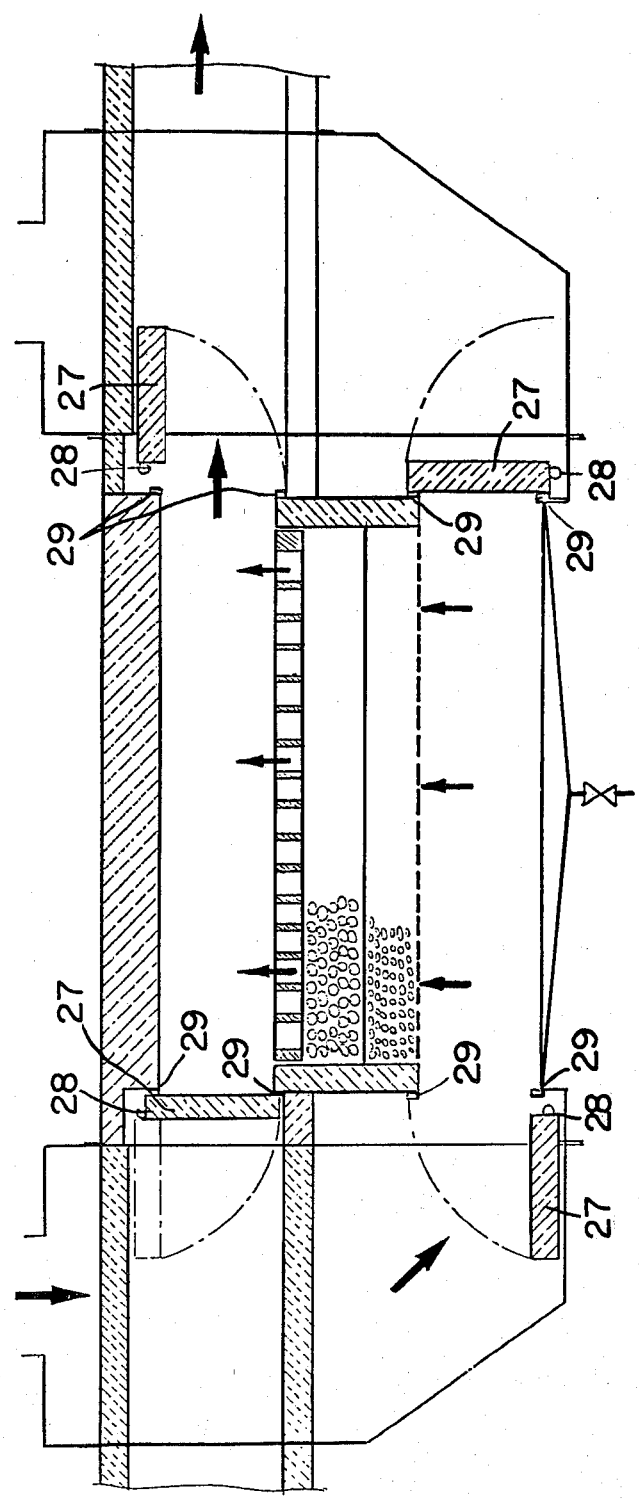
FIG. 6 shows one variation in the flow reversing system of gaseous fluids.

FIG. 6 shows one embodiment for the flow reversing system of gaseous fluids. In this embodiment, the sets of valves 4 and 12 as shown in FIGS. 1 and 2 are replaced by check valves 27 which can rotate about an axis 28. The controls and bearings are placed outside the exchanger units to minimize heat loss and fluid leakage.

A tight seal is provided by flexible gaskets 29. These gaskets are made of a heat resistant material such as heat resistant silico-aluminous felt and should be provided at least for the top of the unit which is exposed to the hot gaseous fluids. This design considerably limits the risks of gaseous fluid leaking toward the inside or outside of the exchanger.

Figure 7:
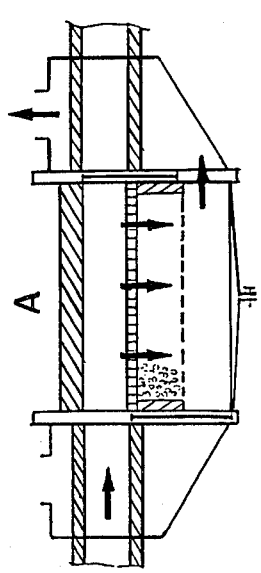
FIGS. 7-18 show the directions of fluid flow in units A and B.
Figure 9:
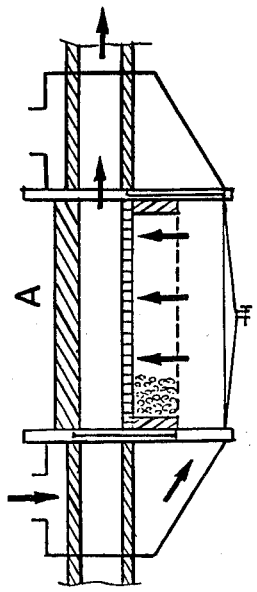
Figure 8:
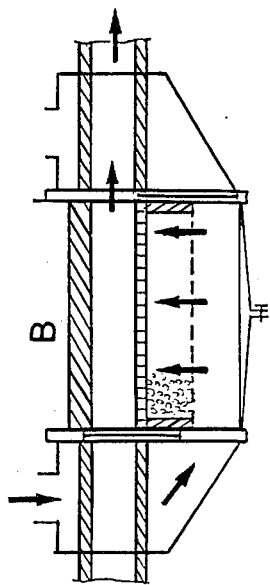
Figure 10:
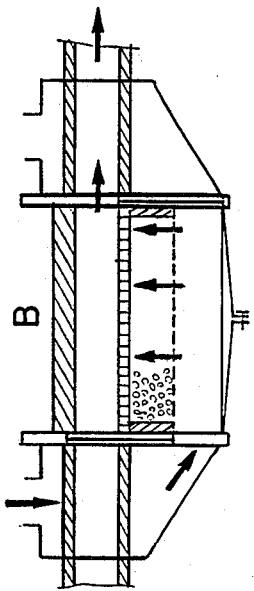

FIGS. 7-12 show the direction of gaseous fluid flow in opposite directions for a sliding valve exchanger. Specifically, FIGS. 7 and 8 depict the fluid flow in units A and B during a given half cycle. The gaseous fluid to be cooled flows downwardly through unit A, which functions as the heated unit. The gaseous fluid to be heated flows upwardly through unit B, which functions as the heating unit.

FIS. 9 and 10 show the gaseous fluid flow in units A and B during the time interval between two half cycles. The gaseous fluid to be heated flows upwardly through both units A and B to sweep and dilute the gaseous fluid to be cooled which was previously contained in the heated unit (i.e., unit A in this embodiment). The duration of the operation depends on the flow rate of the gaseous fluid to be heated and the increase in its mass volume during heating. That time must be sufficient, however, to allow unit A to be completely swept by the fluid to be heated during that interval.

Figure 11:
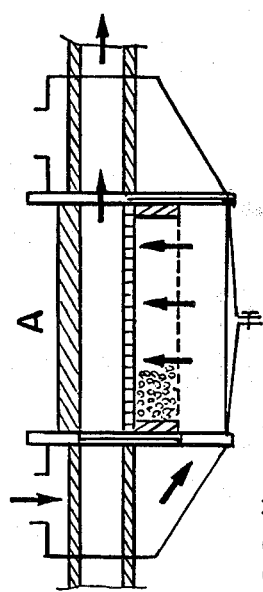
Figure 12:
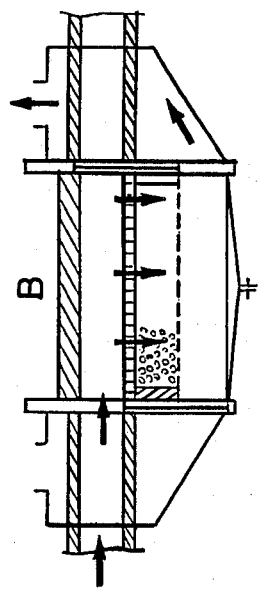
Figure 13:
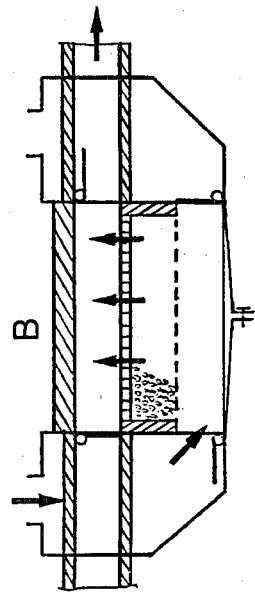
Figure 15:
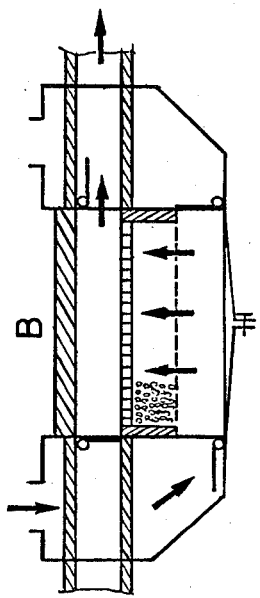
Figure 17:
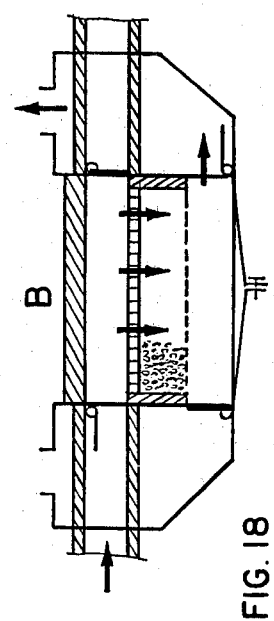
Figure 14:
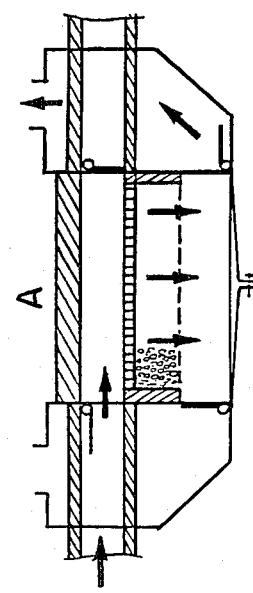
Figure 16:
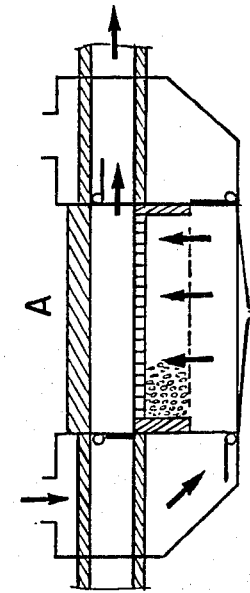
Figure 18:
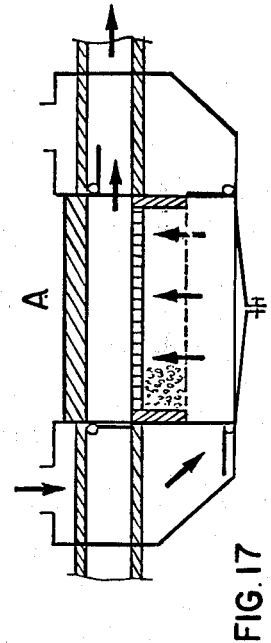

FIGS. 11 and 12 show the gaseous fluid flow during the half cycle following this intermediary "sweeping". The gaseous fluid to be heated continues to flow upwardly through unit A, which functions as the heating unit. The gaseous fluid to be cooled now flows downwardly through unit B, which functions as the heated unit.

FIGS. 13-18 show the process by which the flow directions of the gaseous fluids are reversed. The flow pattern is similar to the one in FIGS. 7-12, but is for an exchanger with swinging check valves such as those shown in FIG. 6. All check valves in both units A and B swing simultaneously in the same direction, thus facilitating mechanical synchronization of their movement. As indicated for FIGS. 7-12, during flow reversal there is dephasing between the valve movement on units A and B to ensure adequate sweeping of the gaseous fluid to be cooled by the gaseous fluid to be heated.

The exchanger units can be filled with ceramic particles commonly used in chemical engineering for packing rectifying columns; for example, Intalox Saddles, Torus Saddles, Berl Saddles, Raschig Rings, Pall Rings, and the like. These materials are described in various chemical engineering manuals on rectified distillation and particularly in "Techniques de l'Ingenieur", Section Genie Chimique (J-Tome 2) 1965 edition, page J-2626-1. These refractory particles rest on a perforated metal sheet in which the openings account for at least 50% of the total area, or on a honeycomb-type ceramic structure also well known in chemical engineering. The particles can also rest on a wire lattice or an expanded metal grid. It should be noted that this support is located on the cold side of the ceramic particle bed to ensure proper mechanical wear.

The following example is given for purposes of illustration and not by way of limitations.

EXAMPLE

The exchanger of the present invention is installed on a tilting furnace used for smelting aluminum and maintaining it in a molten state. The furnace has a metal holding capacity of 27 metric tons and is powered by two burners each with a heating capacity of 500 thermal units per hour in cold air.

The exchanger comprises two units that are packed with a bed of TORUS saddles measuring $\frac{1}{2}$ inch in width (12-13 mm), 685 kg/m$^3$ in bulk density, 71% porosity and 620 m$^2$/m$^3$ exchanger surface area. Each bed has 0.45 m$^2$ in surface area, is 160 mm thick, and contains 50 kg of ceramic particles. The exchanger surface area per unit is thus approximately 45 square meters.

The bed rests on an expanded metal grid reinforced by metal brackets. The bed is covered with a 50 mm thick, perforated refractory slab. The holes in this slab are 50 mm in diameter and are spaced every 60 mm so as to form a hexagonal network. When the furnace is operating at maximum heat, the smoke flow rate is 1720 kg/hour and the smoke temperature is approximately 1000° C. at the level of the furnace stack.

Smoke is drawn in at the level of the stack through a duct which brings it to the exchanger inlet. When smoke enters the exchanger, its temperature exceeds 975° C. After flowing through the bed of ceramic particles, the smoke temperature falls to approximately 200° C. yielding an average temperature that is higher than the acid dew point of smoke. However, under continuous running conditions, this temperature continuously increases from 150° C. at the beginning of the heating cycle to 250° C. at the end of the heating cycle. Therefore, there is a risk that, when the smoke leaves the bed, its temperature will be lower than the smoke acid dew point. This risk is greater at initial start-up. Because the smoke experiences a 200 mm CE (20 mbars) pressure loss by flowing through the bed of ceramic particles, an exhaust fan must be installed at the exchanger outlet.

With a 10 second half-cycle and the furnace operating at maximum capacity, the temperature of a ceramic particle at a given point in the particle bed varies from $-50°$ C. to $+50°$ C. around the value of the average temperature. In addition, the vertical temperature gradient in the bed is approximately 50° C/cm. Under these conditions, the vertical heat flux or specifically the conduction between the hot side and cold side of the bed, which can lessen exchanger efficiency, remains less than 1% of the heat exchanged between the gas and the ceramic particles. This has been found to be acceptable. Also, the heat recovered from smoke can reach 350 thermal units per hour. Heat loss from the exchanger at the walls or from leaks can be approximately 35 thermal units per hour and the combustion air absorbs 315 thermal units per hour. Thus, the air temperature can rise from 20 to about 800° C.

When the flow rate of natural gas is constant, equal to about 115 cubic Normo-meters per hour, the input power in the furnace then goes from 1000 to 1315 thermal units per hour. When this constant input power in the furnace is maintained at 1000 thermal units per hour, the flow rate of natural gas required is decreased from 115 cubic Normo-meters per hour to 87 cubic Normo-meters per hour. This represents an energy savings of 24%. At the same time, the flow rate of smoke is decreased from 1720 to 1300 kg/hour. This causes a reduction in the pressure loss experienced by the smoke when flowing through one or both beds of ceramic particles. This loss is reduced to 12 millibars or less. As a result, the optimum reversing half-cycle increases from 10 to 13 seconds. Consequently, the burner flames are shorter and brighter, and an improved heat transfer from the flames to the load is achieved.

It has also been observed that in the case of burner malfunction caused by an excessive amount of combustion air, gas overconsumption is much lower when a recovery-type heat exchanger is used. This is because most of the additional heat emitted with the smoke because of the excessive amount of air is recovered for preheating this very same excess air. This is why use of the recovery-type heat exchanger mentioned above with a 100% excess of air only results in a 10% natural gas overconsumption; whereas without the device, there would be a 75% overconsumption.

When the power required at a given moment is lower than the maximum design power, the following factors are varied proportionally:

(a) the flow rate of natural gas;

(b) the flow rate of combustion air introduced; and
(c) the flow rate of smoke drawn out.

It should be noted that these flow rate regulating controls, well known to the technician, are located in zones where cold gas flows (between the supply fan and the exchanger for combustion air) or where cooled gas flows (between the exchanger and the exhaust fan for smoke).

Pressure loss in gases upon flow through the bed of ceramic particles is reduced by the squares of the flow rates. The reversing cycle, therefore, is adjusted in reverse proportion to the smoke and combustion air flow rates to maintain a limited air-smoke mixture ratio. This adjustment can be performed by any electric or electronic system using conventional temperature and flow rate gauges. The efficiency of the exchanger, however, remains constant. In the case given in this example, the exchanger efficiency is between 70% and 80%.

It will be understood that changes may be made in the subject matter described without departing from the spirit of the invention, especially as defined in the following claims.

What is claimed is:

1. A recovery-type heat exchanger for the indirect transfer of heat between a hot gaseous fluid and a cold gaseous fluid which flow in opposite directions, said heat exchanger comprising two heat exchange units that function alternately as a heating unit and a heated unit; at least one bed of ceramic particles positioned within each heat exchange unit, a portion of the bed including acid resistant particles; a perforated support in each heat exchange unit for holding the bed of ceramic particles; means for creating a counterflow of the two gaseous fluids so that the hot gaseous fluid can pass to the heated unit through the upper portion of the bed and, upon cooling, can flow through the perforated support and from the lower portion of said bed before passing from the heat exchanger, whereas the cold gaseous fluid can pass to the heating unit through the lower portion of the bed and the perforated support and, once heated, can pass from the upper portion of said bed before passing from the heat exchanger; means for measuring the temperature of at least one of the gaseous fluids; and means for rapidly reversing the direction of the hot and cold gaseous fluids in response to the temperature of the fluids in a continuous cycle, the time of each half-cycle being from 10 to 13 seconds whereby the temperature at a given point in the bed varies only ±50° C. from an average value.

2. The recovery-type heat exchanger as claimed in claim 1 in which the beds of ceramic particles have a specific heat exchange surface area of at least 300 square meters per cubic meter, over 50 percent porosity and less than 20 millibars pressure loss per meter of bed thickness for a 20° C. air stream flowing through the bed at a rate of 4500 kilograms per square meter of bed per hour.

3. The recovery-type heat exchanger as claimed in claim 2 in which a perforated refractory slab rests on the bed of ceramic particles to maintain the bed in position.

4. The recovery-type heat exchanger as claimed in claim 2 or claim 3 in which both heat exchange units comprise at least two beds of ceramic particles, one above the other, wherein the lower bed includes acid resistant ceramic particles.

5. The recovery-type heat exchanger as claimed in claim 4 in which the beds of ceramic particles are 5 to 50 millimeters thick.

6. The recovery-type heat exchanger as claimed in claim 1 in which the support is metal.

7. The recovery-type heat exchanger as claimed in claim 1 in which the support is ceramic.

8. The recovery-type heat exchanger as claimed in claims 1, 2 or 3 in which the means for rapidly reversing the direction of gaseous flow is regulated according to the gaseous fluid flow rates.

9. The recovery-type heat exchanger as claimed in claim 8 in which the hot gaseous fluid comprises furnace smoke at a temperature of at least 800° C. when entering said heat exchanger.

* * * * *